United States Patent
Aota et al.

(10) Patent No.: US 7,952,671 B2
(45) Date of Patent: May 31, 2011

(54) LIQUID CRYSTAL DISPLAY DEVICE HAVING ETCHING STOPPER ELECTRODE AND METHOD OF MANUFACTURING THE LIQUID CRYSTAL DISPLAY DEVICE

(75) Inventors: Masaaki Aota, Ogaki (JP); Satoshi Ishida, Ogaki (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 12/169,419

(22) Filed: Jul. 8, 2008

(65) Prior Publication Data

US 2009/0027579 A1     Jan. 29, 2009

(30) Foreign Application Priority Data

Jul. 26, 2007   (JP) ................. 2007-194170

(51) Int. Cl.
    *G02F 1/1343*   (2006.01)
(52) U.S. Cl. ............... 349/141; 349/147; 257/59
(58) Field of Classification Search ........... 349/141, 349/147, 148; 257/59
    See application file for complete search history.

(56) References Cited

U.S. PATENT DOCUMENTS

| | | | |
|---|---|---|---|
| 6,449,026 B1 * | 9/2002 | Min et al. ............ | 349/141 |
| 6,861,368 B2 | 3/2005 | Chae | |
| 6,887,744 B2 | 5/2005 | Hotta | |
| 2002/0089631 A1 * | 7/2002 | Lee et al. ........... | 349/141 |
| 2002/0105604 A1 * | 8/2002 | Ha et al. ............ | 349/43 |
| 2002/0139983 A1 | 10/2002 | Choi et al. | |
| 2004/0066485 A1 | 4/2004 | Shiota | |
| 2005/0041170 A1 | 2/2005 | Chae | |
| 2007/0024789 A1 | 2/2007 | Itou et al. | |

FOREIGN PATENT DOCUMENTS

| | | |
|---|---|---|
| EP | 1 813 979 A2 | 8/2007 |
| JP | A-2002-296611 | 10/2002 |
| KR | 2003-0051370 A | 6/2003 |
| KR | 10-0412619 | 12/2003 |

* cited by examiner

Primary Examiner — Michael H Caley
(74) Attorney, Agent, or Firm — K&L Gates LLP (57) ABSTRACT

A liquid crystal display device comprising: a switching element that has a drain electrode and that is arranged on a substrate; a first insulating film that covers the switching element and that has a first opening on the drain electrode; a first etching stopper electrode that is formed in the first opening and that is connected to the drain electrode; a common electrode that is arranged on the first insulating film; a second insulating film that covers the first etching stopper electrode and the common electrode, and that has a second opening on the first etching stopper electrode; and a pixel electrode that is connected through the second opening to the first etching stopper electrode and that extends onto the second insulating film so as to face the common electrode.

9 Claims, 12 Drawing Sheets

LIQUID CRYSTAL DISPLAY DEVICE HAVING ETCHING STOPPER ELECTRODE AND METHOD OF MANUFACTURING THE LIQUID CRYSTAL DISPLAY DEVICE

BACKGROUND

1. Technical Field

The present invention relates to a liquid crystal display device and a method of manufacturing the liquid crystal display device and, more particularly, to a liquid crystal display device that controls a liquid crystal using an electric field that is substantially horizontal with respect to a transparent substrate and a method of manufacturing the liquid crystal display device.

2. Related Art

Liquid crystal display devices that use an electric field substantially horizontal with respect to a transparent substrate, that is, liquid crystal display devices that operate in a Fringe-Field Switching (FFS) mode, an In-Plain Switching (IPS) mode, or the like, are known as the liquid crystal display devices that have high contrast and wide viewing angle.

In these liquid crystal display device, pixel electrodes, each of which is supplied with a display signal, and common electrodes that are supplied with a common electric potential both are arranged on one of transparent substrates. Each of the pixel electrodes is connected to the drain electrode of a pixel transistor formed on the one of the transparent substrates. Each of the common electrodes is connected to the lead line of a common electrode line that is formed on the one of the transparent substrate and that is supplied with a common electric potential. In addition, lower layer electrodes for external connection and upper layer electrodes laminated on the corresponding lower layer electrodes are formed at a terminal portion.

Here, the drain electrodes, the lead lines and the lower layer electrodes are initially covered with an insulating film. After that, dry etching is performed on the insulating film to thereby form openings that respectively expose a corresponding one of the drain electrodes, a corresponding one of the lead lines and a corresponding one of the lower layer electrodes. Then, the drain electrodes, the lead lines and the lower layer electrodes are respectively connected through the openings to the pixel electrodes, the common electrodes and the upper layer electrodes.

Note that JP-A-2002-296611 describes a liquid crystal display device that controls a liquid crystal using an electric field that is substantially horizontal with respect to a transparent substrate.

However, according to a method of manufacturing the above liquid crystal display device, in a process in which the drain electrode of the pixel transistor is connected to the pixel electrode, there has been a possibility that a contact resistance may increase because a residual deposit produced during dry etching intervenes between these electrodes. In addition, a residual deposit also intervenes between the lower layer electrode and upper layer electrode of the terminal portion, so that there has been a possibility that not only an increase in contact resistance but also peeling or poor connection of the upper layer electrode due to the residual deposit may occur. As a result, there has been a problem, such as poor display or delay of signal transmission.

As measures against the above problem, it is conceivable that the above residual deposit is removed by etching. However, when the residual deposit is removed by etching, another layer, which originally should not be removed, is also etched at the same time. Thus, poor formation occurs and, hence, reduces yields.

SUMMARY

An aspect of the invention provides a method of manufacturing a liquid crystal display device. The method of manufacturing the liquid crystal display device includes forming a switching element, which has a drain electrode, on a substrate; forming a first insulating film that covers the drain electrode; forming an opening, which exposes the drain electrode, in the first insulating film; forming a first etching stopper electrode that covers the opening and that is connected to the drain electrode and, at the same time, forming a common electrode on the first insulating film; forming a second insulating film by covering the first etching stopper electrode and the common electrode; selectively etching the second insulating film on the first etching stopper electrode in a first etching process; after the first etching process, removing a residue on the first etching stopper electrode by etching in a second etching process; and, after the second etching process, forming a pixel electrode that is connected to the first etching stopper electrode and that extends onto the second insulating film so as to face the common electrode.

In addition, another aspect of the invention provides a method of manufacturing a liquid crystal display device. The method of manufacturing the liquid crystal display device includes forming a switching element and a common electrode line on a substrate; forming a drain electrode of the switching element and a lead line of the common electrode line; forming a first insulating film that covers the drain electrode and the lead line; forming a first opening, which exposes the drain electrode, and a second opening, which exposes the lead line, in the first insulating film; forming a first etching stopper electrode that is connected through the second opening to the lead line and, at the same time, forming a pixel electrode on the first insulating film; forming a second insulating film by covering the first etching stopper electrode and the pixel electrode; selectively etching the second insulating film on the first etching stopper electrode in a first etching process; after the first etching process, removing a residue on the first etching stopper electrode by etching in a second etching process; and, after the second etching process, forming a common electrode that is connected to the first etching stopper electrode and that extends onto the second insulating film so as to face the pixel electrode.

In addition, yet another aspect of the invention provides a method of manufacturing a liquid crystal display device. The method of manufacturing the liquid crystal display device includes forming a switching element on a substrate; forming a drain electrode of the switching element and a common electrode line; forming a first insulating film that covers the drain electrode and the common electrode line; forming a first opening, which exposes the drain electrode, and a second opening, which exposes the common electrode line, in the first insulating film; forming a first etching stopper electrode that is connected through the second opening to the common electrode line and, at the same time, forming a pixel electrode on the first insulating film; forming a second insulating film by covering the first etching stopper electrode and the pixel electrode; selectively etching the second insulating film on the first etching stopper electrode in a first etching process; after the first etching process, removing a residue on the first etching stopper electrode by etching in a second etching process; and, after the second etching process, forming a common electrode that is connected to the first etching stopper electrode and that extends onto the second insulating film so as to face the pixel electrode.

In addition, further another aspect of the invention provides a liquid crystal display device. The liquid crystal display device includes a switching element, a first insulating film, a first etching stopper electrode, a common electrode, a second insulating film, and a pixel electrode. The switching element has a drain electrode and is arranged on a substrate. The first insulating film covers the switching element and has a first opening on the drain electrode. The first etching stopper electrode is formed in the first opening and is connected to the drain electrode. The common electrode is arranged on the first insulating film. The second insulating film covers the first etching stopper electrode and the common electrode, and has a second opening on the first etching stopper electrode. The pixel electrode is connected through the second opening to the first etching stopper electrode and extends onto the second insulating film so as to face the common electrode.

In addition, yet another aspect of the invention provides a liquid crystal display device. The liquid crystal display device includes a switching element, a common electrode line, a lead line, a first insulating film, a first etching stopper electrode, a pixel electrode, a second insulating film, and a common electrode. The switching element has a drain electrode and is arranged on a substrate. The common electrode line is arranged on the substrate. The lead line extends from the common electrode line. The first insulating film covers the switching element, the drain electrode and the lead line, and has a first opening on the drain electrode and a second opening on the lead line. The first etching stopper electrode is formed in the second opening and is connected to the lead line. The pixel electrode is arranged on the first insulating film. The second insulating film covers the first etching stopper electrode and the pixel electrode, and has a third opening on the first etching stopper electrode. The common electrode is connected through the third opening to the first etching stopper electrode and extends onto the second insulating film so as to face the pixel electrode.

In addition, further another aspect of the invention provides a liquid crystal display device. The liquid crystal display device includes a switching element, a common electrode line, a first insulating film, a first etching stopper electrode, a pixel electrode, a second insulating film and a common electrode. The switching element has a drain electrode and is arranged on a substrate. The common electrode line is arranged on the substrate. The first insulating film covers the switching element, the drain electrode and the common electrode line, and has a first opening on the drain electrode and a second opening on the common electrode line. The first etching stopper electrode is formed in the second opening and is connected to the common electrode line. The pixel electrode is arranged on the first insulating film. The second insulating film covers the first etching stopper electrode and the pixel electrode, and has a third opening on the first etching stopper electrode. The common electrode is connected through the third opening to the first etching stopper electrode and extends onto the second insulating film so as to face the pixel electrode. In addition, the liquid crystal display device of the aspect of the invention may further include a lower layer electrode for external connection, a second etching stopper electrode, and an upper layer electrode for external connection, wherein the lower layer electrode is arranged on the substrate and is covered with the first insulating film, wherein the second etching stopper electrode is formed on the first insulating film and is connected through an opening of the first insulating film to the lower layer electrode, and wherein the upper layer electrode is formed on the second insulating film and is connected to the second etching stopper electrode in an opening of the second insulating film. In addition, the liquid crystal display device according to the aspect of the invention may further include an opposite substrate that is arranged so as to face the substrate and a liquid crystal that is held between the substrate and the opposite substrate, wherein an alignment direction of the liquid crystal is controlled by an electric field generated between the common electrode and the pixel electrode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
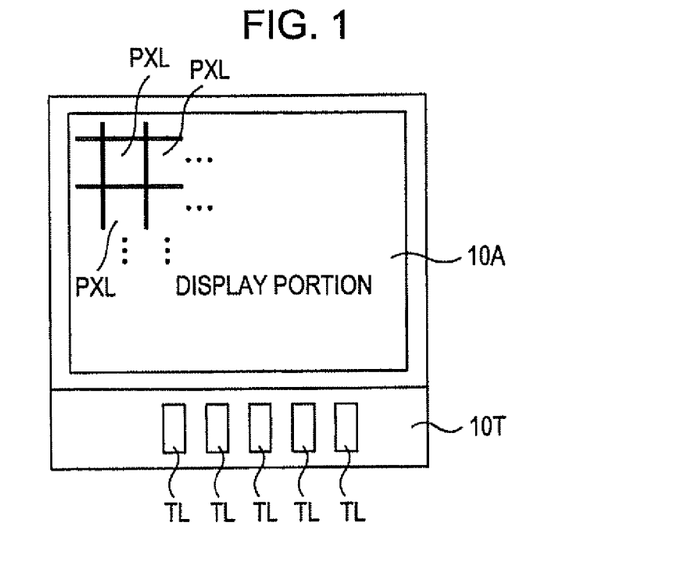
FIG. 1 is a plan view that shows the schematic configuration of a liquid crystal display device according to a first embodiment of the invention.
Figure 2:
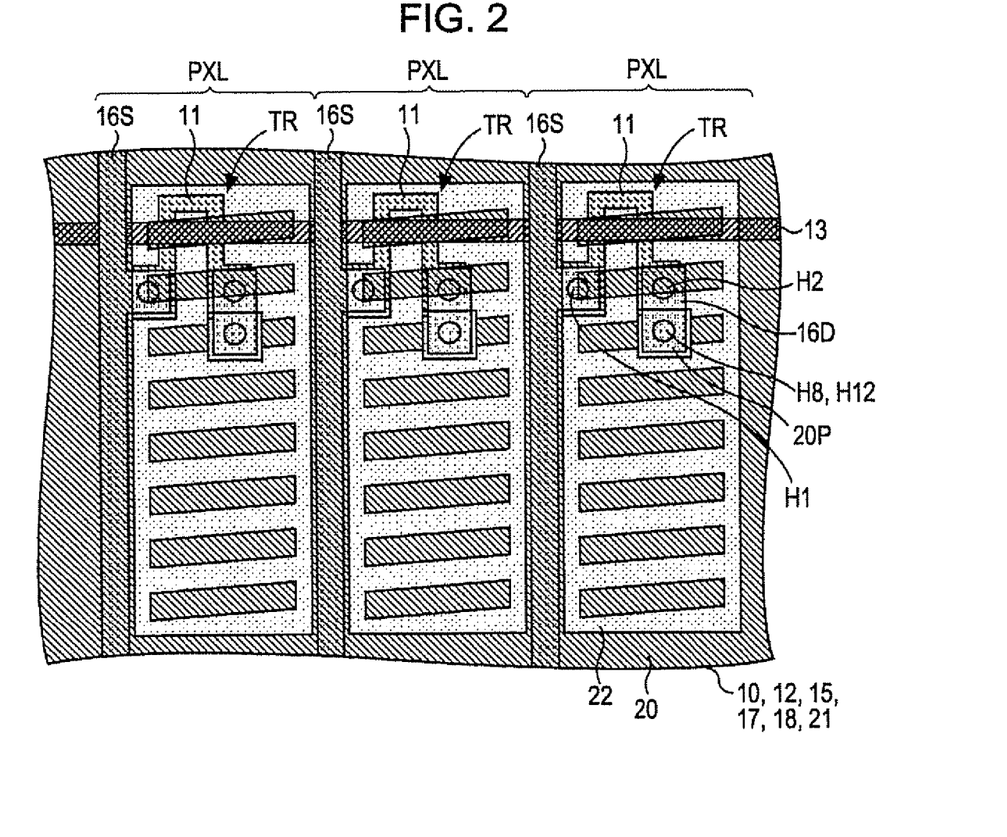
FIG. 2 is an enlarged plan view that shows pixels in a display portion shown in FIG. 1.
Figure 3:
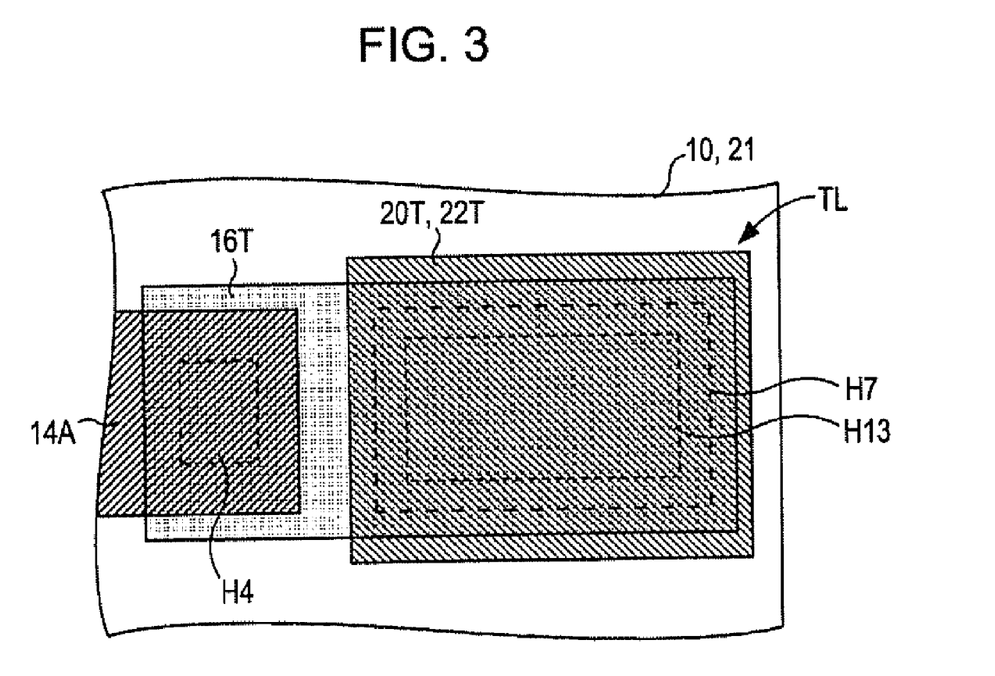
FIG. 3 is an enlarged plan view of a terminal in a terminal portion shown in FIG. 1.

The planar configuration of a liquid crystal display device according to a first embodiment of the invention will now be described with reference to the accompanying drawings. FIG. 1 is a plan view that shows the schematic configuration of the liquid crystal display device according to the present embodiment. In addition, FIG. 2 is an enlarged plan view of only three pixels PXL from among a plurality of pixels PXL that are formed in a display portion 10A shown in FIG. 1. FIG. 2 shows the configuration that operates in an FFS mode. FIG. 3 is an enlarged plan view of one of a plurality of terminals TL of a terminal portion 10T shown in FIG. 1. FIG. 1 to FIG. 3 only show major components for the sake of convenience of description.

Note that, in the following description regarding the planar configuration, a gate insulating film 12, an interlayer insulating film 15, a passivation film 17 and a planarization film 18 are also referred to in order to supplement the configuration of contact holes H1 to H13; however, the relationship in lamination of these components will be described later at the same time in regard to a method of manufacturing the liquid crystal display device.

As shown in FIG. 1, the display portion 10A and the terminal portion 10T are arranged in the liquid crystal display device. A plurality of pixels PXL are arranged in the display portion 10A. The plurality of terminals TL for external connection are arranged in the terminal portion 10T. In the display portion 10A, as shown in FIG. 2, the pixels PXL are arranged at positions corresponding to intersections of gate lines 13 to which gate signals are supplied and source lines 16S to which source signals (display signals) are supplied.

A pixel transistor TR, such as a thin-film transistor, that uses the gate line 13 as a gate electrode is arranged on the first transparent substrate 10 in each pixel PXL. The source of the pixel transistor TR is connected to a corresponding one of the source lines 16S through the contact hole H1, which is formed in the gate insulating film 12 and the interlayer insulating film 15. The drain of the pixel transistor TR is connected to a drain electrode 16D through the contact hole H2, which is formed in the gate insulating film 12 and the interlayer insulating film 15. The drain electrode 16D is connected to a first etching stopper electrode 20P through the contact hole H5, which is formed in the passivation film 17, and the contact hole H8, which is formed in the planarization film 18. Common electrodes 20 are formed in the same layer as the first etching stopper electrodes 20P, and the common electrodes 20 each are made of the same conductive material as the first etching stopper electrode 20P. The pixel transistor TR is an example of a switching element according to the aspects of the invention.

The first etching stopper electrodes 20P and the common electrodes 20 are covered with an insulating film 21. Each first etching stopper electrode 20P is connected through the contact hole H12, which is formed in the insulating layer 21, to the pixel electrode 22 that is arranged on the insulating film 21. Each pixel electrode 22 has a shape in which a plurality of slit portions and a plurality of linear portions extend alternately in parallel relation to one another. Each common electrode 20 is connected to a common electrode line (not shown), which extends to the vicinity of the end portion of the display portion 10A and which is supplied with a common electric potential, through a contact hole (not shown). In addition, the common electrodes 20, the insulating films 21 and the pixel electrodes 22 are laminated in this order, so that holding capacitors that hold source signals for a certain period of time are formed. Aside from this, other holding capacitors (not shown) may be formed so that the holding capacitors each are connected to the drain of the pixel transistor TR, hold a source signal for a certain period of time and supply the source signal to the pixel electrode 22.

On the other hand, as shown in FIG. 3, wiring 14A is arranged so as to extend from each pixel PXL of the display portion 10A, or the like, to the terminal portion 10T on a first transparent substrate 10, and part of the wiring 14A is connected to a lower layer electrode 16T of each terminal TL of the terminal portion 10T through the contact hole H4, which is formed in the interlayer insulating film 15. The lower layer electrode 16T is connected to a second etching stopper electrode 20T through the contact hole H7, which is formed in the passivation film 17. The second etching stopper electrode 20T is connected to an upper layer electrode 22T through the contact hole H13, which is formed in the planarization film 18. Terminals (not shown), such as an FPC (Flexible Printed Circuit) or an COG (Chip On Glass), extending from an external driving circuit (not shown), is connected to the upper layer electrode 22T.

In each of the above configured pixels PXL, the pixel transistor TR turns on in response to a pixel selection signal supplied from the gate line 13 and then a source signal is supplied through the source line 16S and the pixel transistor TR to the pixel electrode 22. At this time, an optical control for display is performed between the common electrode 20 and the pixel electrode 22 so that an electric field is generated in a substantially horizontal direction with respect to the first transparent substrate 10 on the basis of the source signal, and the alignment direction of a liquid crystal (not shown) varies on the basis of the generated electric field. On the other hand, each of the terminals TL is supplied through an FPC, or the like, with a driving signal, such as a pixel selection signal or a source signal, from a driving circuit (not shown).

The method of manufacturing the liquid crystal display device will now be described with reference to the cross-sectional views. FIG. 4A, FIG. 5A, FIG. 6A, FIG. 7A, FIG. 8A, FIG. 9A and FIG. 10 are views, each of which shows one of the pixels PXL of the display portion 10A in the liquid crystal display device and also shows the common electrode line 14 that extends to the vicinity of the end portion of the display portion 10A. In addition, FIG. 4B, FIG. 5B, FIG. 6B, FIG. 7B, FIG. 8B and FIG. 9B are cross-sectional views, each of which shows one of the terminals TL of the terminal portion 10T. Note that, in FIG. 4A to FIG. 10, the same reference numerals are assigned to the components that are identical to those shown in FIG. 1 to FIG. 3.

Figure 4A:
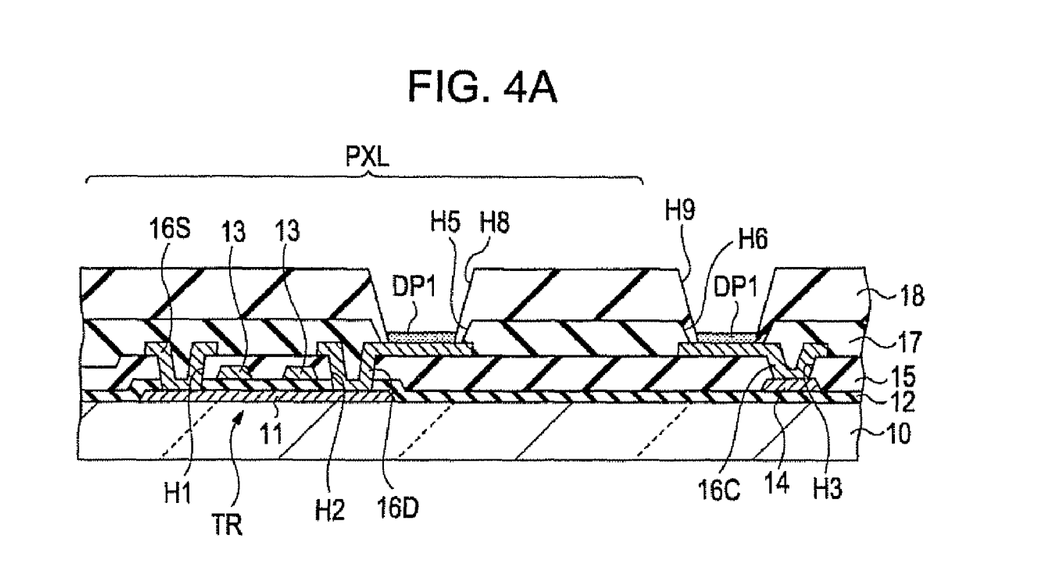
FIG. 4A and FIG. 4B are cross-sectional views that show a method of manufacturing the liquid crystal display device according to the first embodiment of the invention.
Figure 4B:
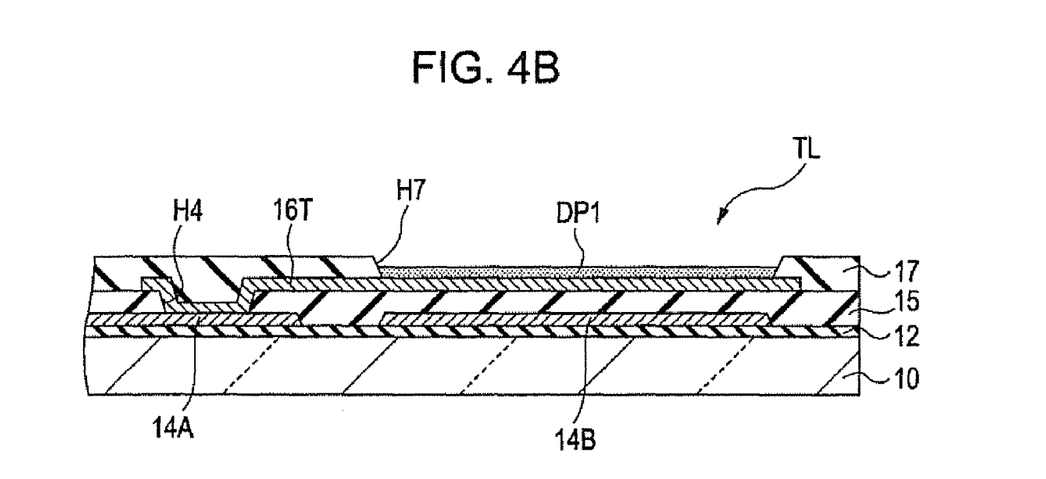

At first, as shown in FIG. 4A and FIG. 4B, in the first transparent substrate 10 of the display portion 10A, an active layer 11 is formed in a region in which the pixel transistor TR is formed within a region in which the pixel PXL is formed. The gate insulating film 12 is formed on the first transparent substrate 10 so as to cover the active layer 11. The gate line 13 is formed on the gate insulating film 12 at a portion that overlaps the active layer 11. The common electrode line 14 is formed on the gate insulating film 12 at a portion adjacent to the end portion of the display portion 10A. In addition, in the first transparent substrate 10 at the terminal portion 10T, the wiring 14A that extends from the display portion 10A and an electrode 14B that adjusts the thickness of the terminals TL adjacent to the wiring 14A are formed. The common electrode lines 14, the wiring 14A and the electrode 14B each are desirably formed of molybdenum or molybdenum alloy.

On the gate insulating film 12, the interlayer insulating film 15 is formed so as to cover the gate line 13, the common electrode line 14, the wiring 14A and the electrode 14B. On the interlayer insulating film 15, the source line 16S that is connected through the contact hole H1 to the source of the active layer 11 and the drain electrode 16D that is connected through the contact hole H2 to the drain of the active layer 11 are formed. In addition, on the interlayer insulating film 15, a lead line 16C that is connected through the contact hole H3 to the common electrode line 14 is formed.

In addition, on the interlayer insulating film 15 of the terminal portion 10T, the lower layer electrode 16T that is connected through the contact hole H4 to the wiring 14A and that extends onto the electrode 14B is formed. The source line 16S, the drain electrode 16D, the lead line 16C and the lower layer electrode 16T all are formed in the same layer at the same time, and are a laminated product that is formed of titanium, aluminum, and titanium in this order. On the interlayer insulating film 15, the passivation film 17, which is an insulating film, is formed so as to cover the source line 16S, the drain electrode 16D, the lead line 16C, and the lower layer electrode 16T. The passivation film 17 is a silicon nitride film that is formed under the environment of, for example, 300 to 400° C. The passivation film 17 is an example of a first insulating film according to the aspects of the invention.

Then, by performing dry etching on the passivation film 17 using a resist layer (not shown) as a mask, the contact hole H5 that exposes the drain electrode 16D and the contact hole H6 that exposes the lead line 16C are formed in the passivation film 17 of the display portion 10A. At the same time, in the passivation film 17 of the terminal portion 10T, the contact hole H7 that exposes the lower layer electrode 16T is formed.

Next, after the resist layer has been removed, the planarization film 18, such as an organic film, is formed in the contact holes H5, H6, and H7 and on the passivation film 17 so as to cover them. Then, by performing dry etching on the planarization film 18 using another resist layer (not shown) as a mask, the contact hole H8 that exposes the drain electrode 16D inside the contact hole H5 and the contact hole H9 that exposes the lead line 16C inside the contact hole H6 are formed. In addition, in the terminal portion 10T, the planarization film 18 is removed, and then the lower layer electrode 16T is exposed inside the contact hole H7 again. The planarization film 18 is an example of the first insulating film according to the aspects of the invention.

In the process of dry etching, inside the contact holes H7, H8, and H9, a residual deposit DP1, such as a polymer having a component of the above resist layer, is formed on the titanium that forms the surface of the drain electrode 16D, the surface of the lead line 16C and the surface of the lower layer electrode 16T.

Note that the contact holes H8 and H9 may be formed by forming the planarization film 18 using a photosensitive resin film without using the above other resist layer, but, in this case as well, the residual deposit DP1 may possibly be formed.

After that, using the resist layer as a mask, by performing wet etching with an etchant, such as HF, the residual deposit DP1 is removed by etching. At this time, because the etching rate of the residual deposit DP1 is larger than that of the passivation film 17 or planarization film 18, there is no problem, such as over etching, that occurs on the passivation film 17 or the planarization film 18.

Figure 5A:
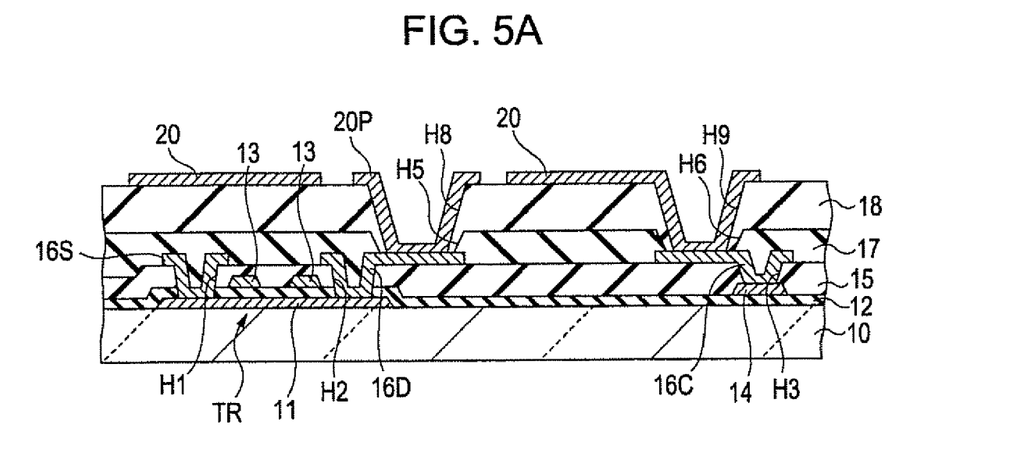
FIG. 5A and FIG. 5B are cross-sectional views that show the method of manufacturing the liquid crystal display device according to the first embodiment of the invention.
Figure 5B:
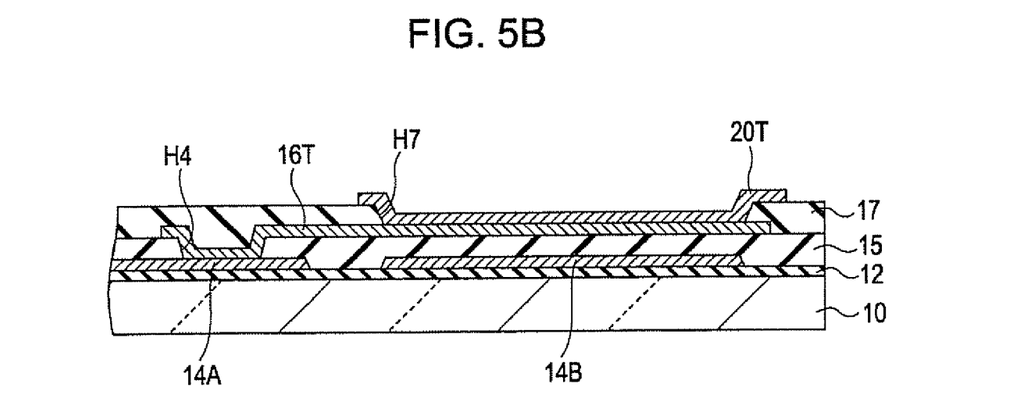

Next, as shown in FIG. 5A and FIG. 5B, the first etching stopper electrode 20P that extends into the contact hole H8 and is connected to the drain electrode 16D is formed. In addition, at the same time, the common electrode 20 is formed to be connected through the contact hole H9 to the lead line 16C and extends onto the planarization film 18. The common electrode 20 is spaced apart from the first etching stopper electrode 20P and surrounds the first etching stopper electrode 20P. Furthermore, at the same time, in the terminal portion 10T, the second etching stopper electrode 20T is formed so as to be connected through the contact hole H7 to the lower layer electrode 16T. The first etching stopper electrode 20P, the common electrode 20, and the second etching stopper electrode 20T are formed of a transparent conductive material, such as ITO (Indium Tin Oxide). The thickness of each of the first etching stopper electrode 20P and the second etching stopper electrode 20T is desirably about 100 nm.

Figure 6A:
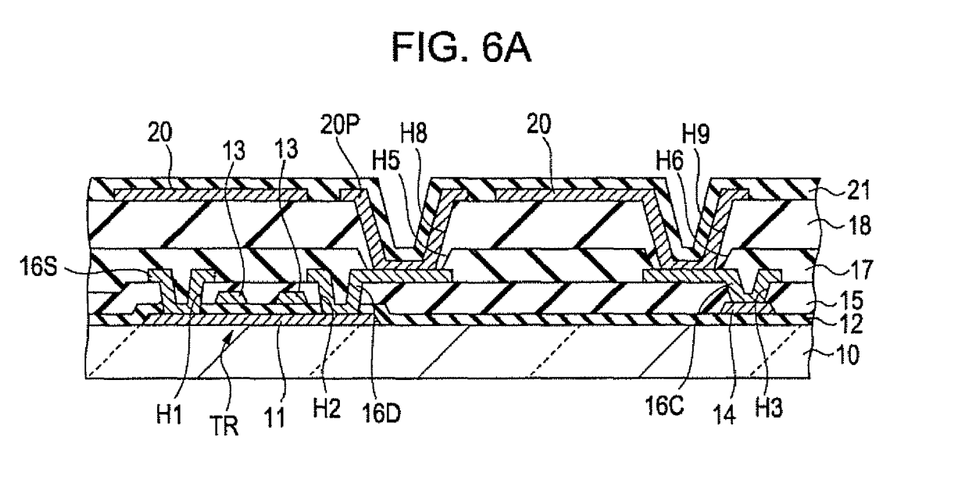
FIG. 6A and FIG. 6B are cross-sectional views that show the method of manufacturing the liquid crystal display device according to the first embodiment of the invention.
Figure 6B:
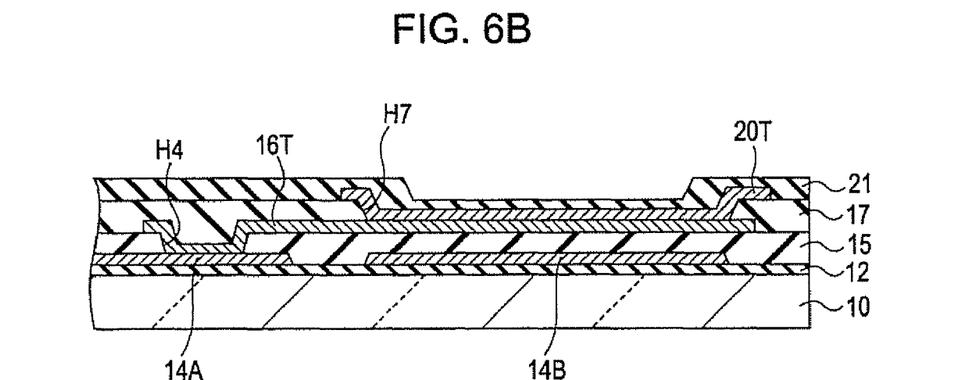

Next, as shown in FIG. 6A and FIG. 6B, the insulating film 21 is formed on the planarization film 18 of the display portion 10A so as to cover the first etching stopper electrode 20P and the common electrode 20. At the same time, in the terminal portion 10T, the insulating film 21 is formed on the passivation film 17 so as to cover the second etching stopper electrode 20T. The insulating film 21 is, for example, formed of a silicon nitride film that is formed at a low temperature of about 200° C. The insulating film 21 is an example of a second insulating film according to the aspects of the invention.

Figure 7A:
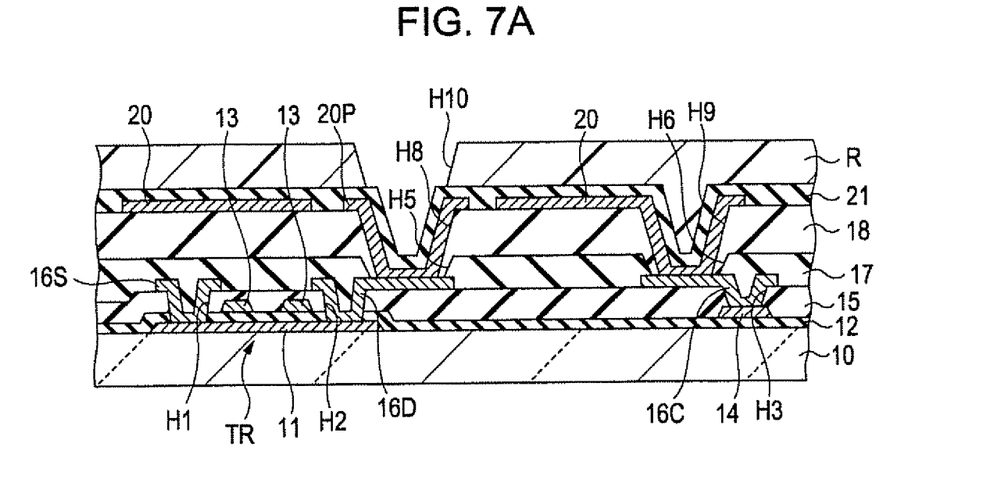
FIG. 7A and FIG. 7B are cross-sectional views that show the method of manufacturing the liquid crystal display device according to the first embodiment of the invention.
Figure 7B:
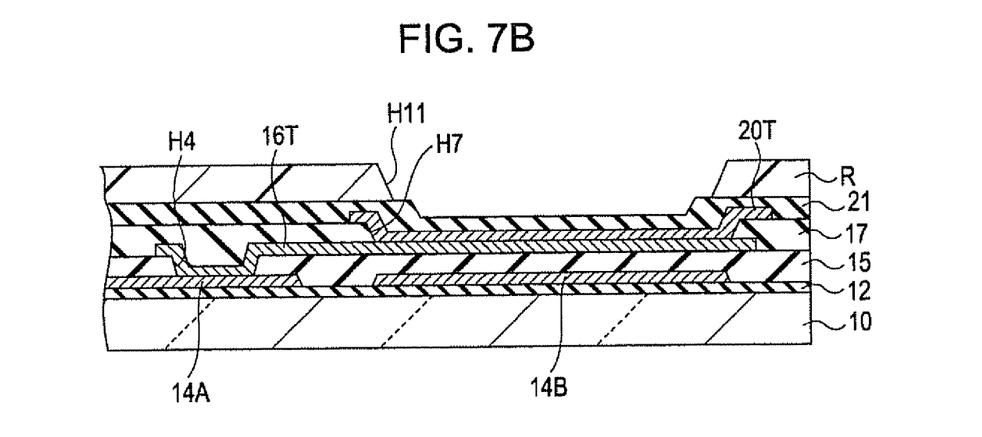

Next, as shown in FIG. 7A and FIG. 7B, a resist layer R is formed on the insulating film 21. In the resist layer R, openings H10 and H11 are respectively formed in the first etching stopper electrode 20P and the second etching stopper electrode 20T.

Figure 8A:
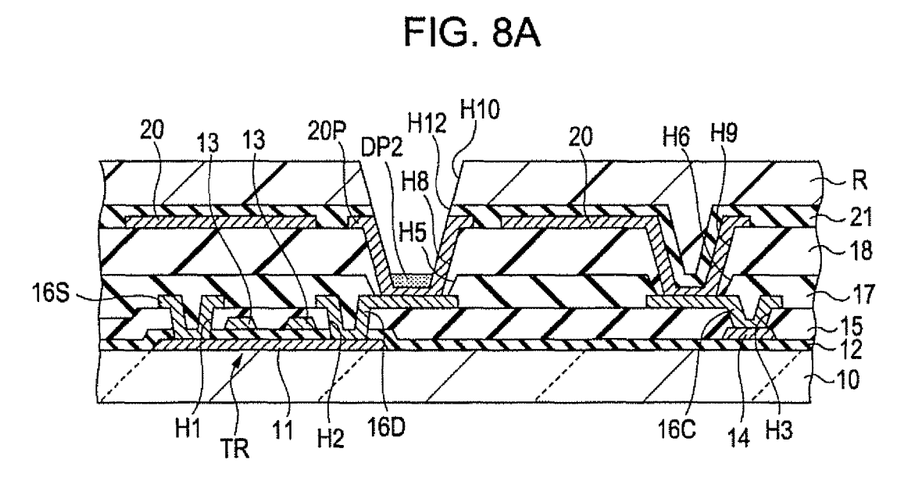
FIG. 8A and FIG. 8B are cross-sectional views that show the method of manufacturing the liquid crystal display device according to the first embodiment of the invention.
Figure 8B:
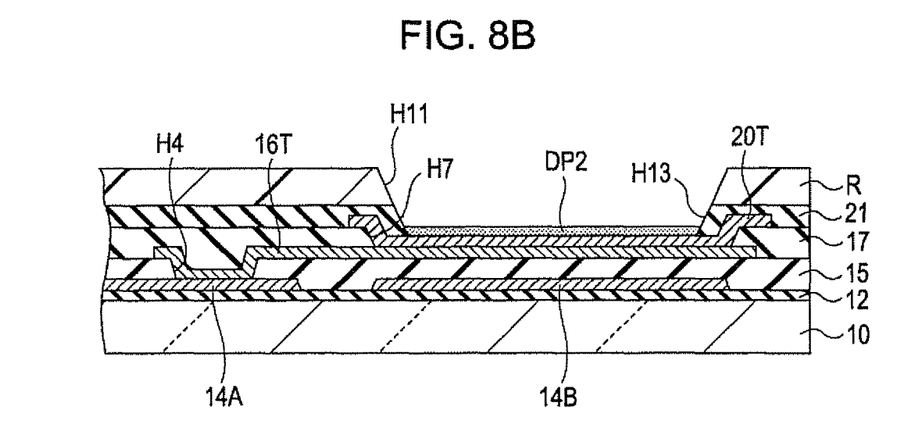

Then, as shown in FIG. 8A and FIG. 8B, using the resist layer R as a mask, dry etching is performed on the insulating film 21 with an etching gas, such as SF6 or CF4/O2, so that the contact hole H12 that exposes the first etching stopper electrode 20P inside the contact hole H8 is formed. At the same time, the contact hole H13 that exposes the second etching stopper electrode 20T inside the contact hole H7 is formed. The dry etching performed on the insulating film 21 is an example of a first etching process according to the aspects of the invention. In the display portion 10A, the first etching stopper electrode 20P functions as an etching stopper during the dry etching in order to stop the progress of dry etching. Thus, the planarization film 18 is never subjected to an etching gas, and a desirably shaped contact hole is maintained.

In addition, in the process of the dry etching, a residual deposit DP2, such as a polymer having a component of the resist layer R, is formed on the surface of the first etching stopper electrode 20P and the surface of the second etching stopper electrode 20T.

After that, using the resist layer R as a mask, by performing wet etching with an etchant, such as HF, the residual deposit DP2 is removed by etching. The wet etching that uses an etchant, such as HF, is an example of a second etching process according to the aspects of the invention.

Then, inside the contact hole H12 of the display portion 10A, the progress of wet etching is stopped by the first etching stopper electrode 20P, so that etching on the passivation film 17 or the planarization film 18 is suppressed. In addition, inside the contact hole H13 of the terminal portion 10T, the progress of wet etching is stopped by the second etching stopper electrode 20T, so that etching on the passivation film 17 is suppressed.

Figure 9A:
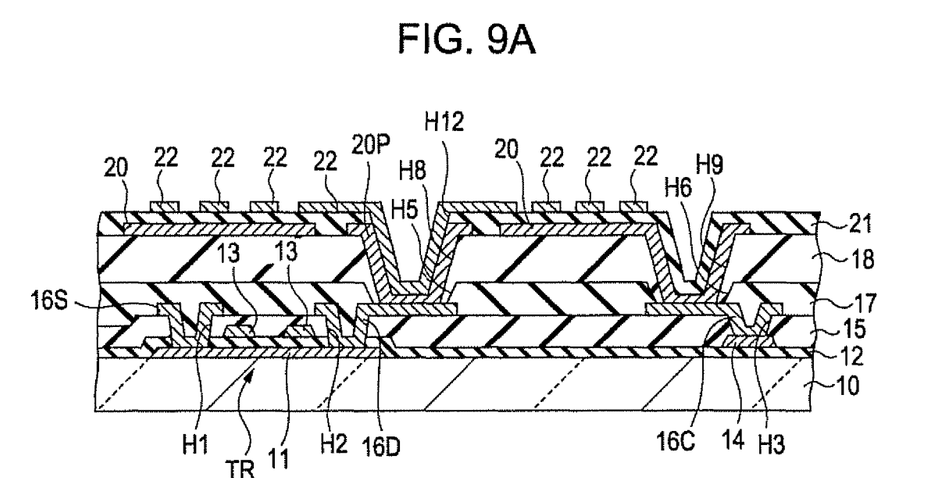
FIG. 9A and FIG. 9B are cross-sectional views that show the method of manufacturing the liquid crystal display device according to the first embodiment of the invention.
Figure 9B:
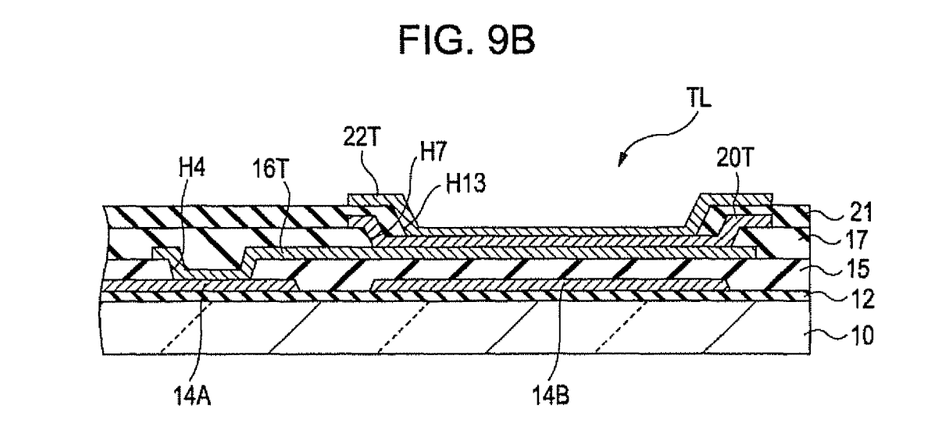

Next, after the resist layer R has been removed, as shown in FIG. 9A and FIG. 9B, in the display portion 10A, the pixel electrode 22 is formed to be connected through the contact hole H12 to the first etching stopper electrode 20P and extends onto the insulating film 21. The pixel electrode 22 is, for example, formed of a transparent conductive material, such as ITO, and is formed of a plurality of slit portions and a plurality of linear portions that are alternately arranged in parallel relation to one another.

At the same time, in the terminal portion 10T, the upper layer electrode 22T is formed of the same transparent conductive material as that of the pixel electrode 22 and is connected through the contact hole H13 to the second etching stopper electrode 20T. In this manner, in the terminal portion 10T, the terminal TL that has the upper layer electrode as an uppermost layer electrode is formed.

Figure 10:
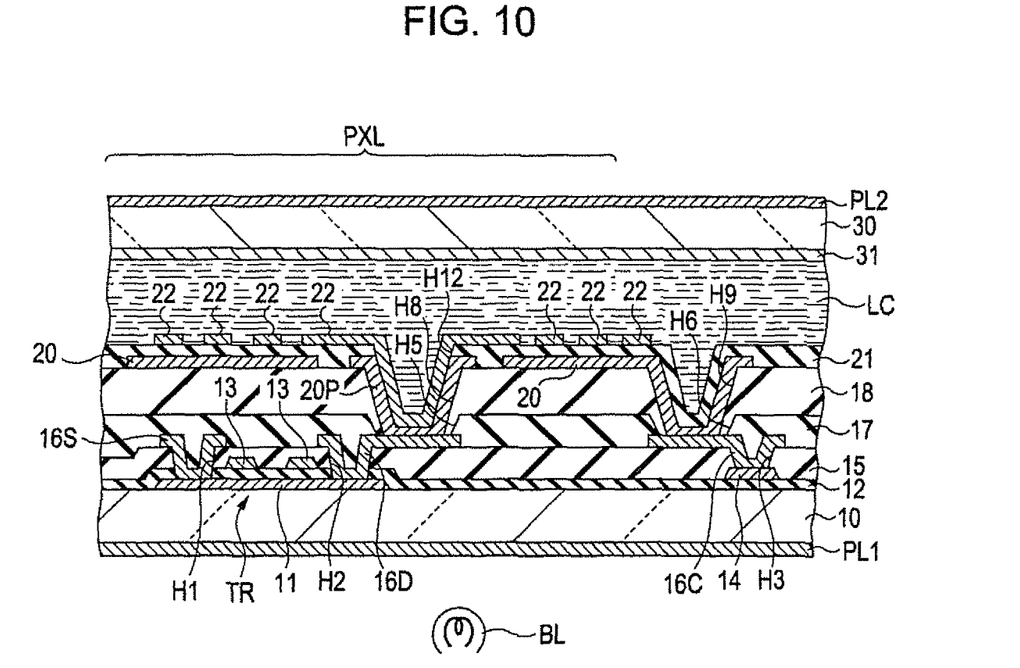
FIG. 10 is a cross-sectional view that shows the method of manufacturing the liquid crystal display device according to the first embodiment of the invention.

After that, as shown in FIG. 10, in the display portion 10A, a second transparent substrate 30 is adhered so as to face the first transparent substrate 10, and then a liquid crystal LC is sealed between these substrates. Note that, in each of the above processes, a first polarizing plate PL1, a second polarizing plate PL2, a color filter 31, an alignment layer (not shown), and the like, are formed appropriately. In addition, a light source BL, such as a backlight, is arranged so as to face the first transparent substrate 10.

In the thus manufactured liquid crystal display device, because there are no residual deposits DP1 and DP2 between the drain electrode 16D and the pixel electrode 22, it is possible to suppress an increase in contact resistance between these electrodes. Similarly, because there are no residual deposits DP1 and DP2 between the lower layer electrode 16T and upper layer electrode 22T of the terminal TL, it is possible to suppress an increase in contact resistance between these electrodes.

If the first etching stopper electrode 20P and the second etching stopper electrode 20T are not formed unlike the above configuration, poor formation occurs because of etching on the passivation film 17 or the planarization film 18. That is, yields are reduced. Alternatively, if the residual deposit DP2 is left without being removed by etching in order to avoid this problem, a contact resistance between the drain electrode 16D and the pixel electrode 22 increases. In addition, in the terminal TL, in addition to an increase in contact resistance as in the case of the above, the upper layer electrode 22T peels off because of the presence of the residual deposit DP2. According to the above process of the aspects of the invention, by forming the first etching stopper electrode 20P and the second etching stopper electrode 20T, it is possible to eliminate these problems at the same time.

Figure 11A:
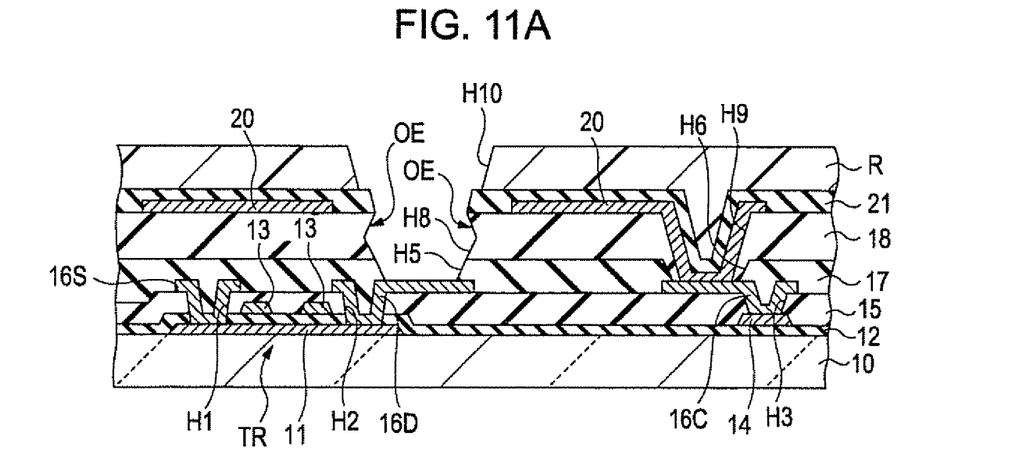
FIG. 11A and FIG. 11B are cross-sectional views that show a method of manufacturing a liquid crystal display device according to an existing art.
Figure 11B:
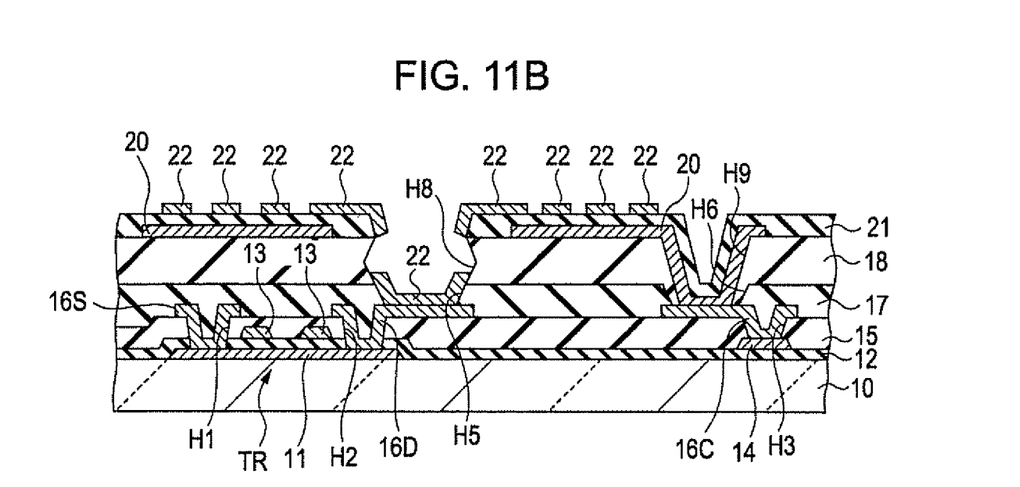

In addition, in the processes shown in FIG. 7A to FIG. 8B, in the process of performing dry etching on the insulating film 21, when there occurs an error in the pattern of the resist layer R, that is, the sizes of the openings H10 and H11 or the position of formation, as shown in FIG. 11A, the planarization film 18 will be etched inside the contact hole H8. At the above etched portion OE, as shown in FIG. 11B, breakage will occur in the pixel electrode 22 that will be formed in the subsequent process. That is, it leads to poor display of the pixel PXL.

In order to cope with this problem, it is conceivable that a margin is ensured in the process of design for the sizes or formed positions of the openings H10 and H11 of the resist layer R. However, there has been another problem that the aperture ratio of each pixel PXL decreases because of the margin. In contrast, in the aspects of the invention, the above problematic etching is suppressed by the first etching stopper electrode 20P and the second etching stopper electrode 20T and, therefore, it is not necessary to ensure the above margin, so that it is possible to avoid an increase in the aperture ratio.

Note that the aspects of the invention may also be applied to the case in which, in the first embodiment, the common electrode 20 is formed in the upper layer above the insulating film 21 and the pixel electrode 22 is formed in the lower layer below the insulating film 21. This case will now be described as a second embodiment of the invention with reference to the accompanying drawings. FIG. 12A to FIG. 16 are views, each of which shows the pixel PXL of the display portion 10A and also shows the vicinity of the common electrode line 14 that extends to the vicinity of the end portion of the display portion 10A in the liquid crystal display device according to the present embodiment.

Note that, in FIG. 12A to FIG. 16, the same reference numerals are assigned to the same components as those shown in FIG. 4A to FIG. 10 and the description thereof is omitted.

In a method of manufacturing the liquid crystal display device according to the present embodiment, the first process is the same as the process shown in FIG. 4A and FIG. 4B according to the first embodiment. Here, the following processes after the first process will be described. However, a description will be made under the condition that the residual deposit DP1 shown in FIG. 4A and FIG. 4B has been removed by etching. In addition, the processes performed on the terminal portion 10T are the same as those shown in FIG. 4B, FIG. 5B, FIG. 6B, FIG. 7B, FIG. 8B and FIG. 9B, so that a description thereof is omitted. The processes shown in FIG. 12 to FIG. 16 respectively correspond to the processes shown in FIG. 5A, FIG. 6A, FIG. 7A, FIG. 8A and FIG. 9A.

Figure 12:
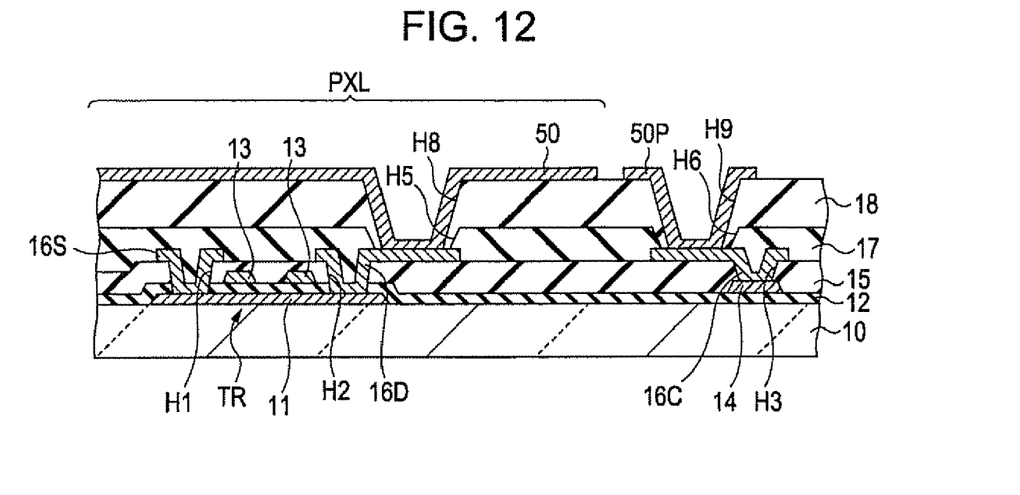
FIG. 12 is a cross-sectional view that shows a method of manufacturing a liquid crystal display device according to a second embodiment of the invention.

In the present embodiment, as shown in FIG. 12, first, a pixel electrode 50 is formed to be connected through the contact hole H8 to the drain electrode 16D and extends onto the planarization film 18. At the same time, a first etching stopper electrode 50P that extends into the contact hole H9 and is connected to the lead line 16C is formed. The pixel electrode 50 and the first etching stopper electrode 50P are formed of a transparent conductive material, such as ITO (Indium Tin Oxide). The pixel electrode 50 and the first etching stopper electrode 50P are formed at the same time with the second etching stopper electrode 20T of the terminal portion 10T. The thickness of the first etching stopper electrode 50P is desirably about 100 nm.

Figure 13:
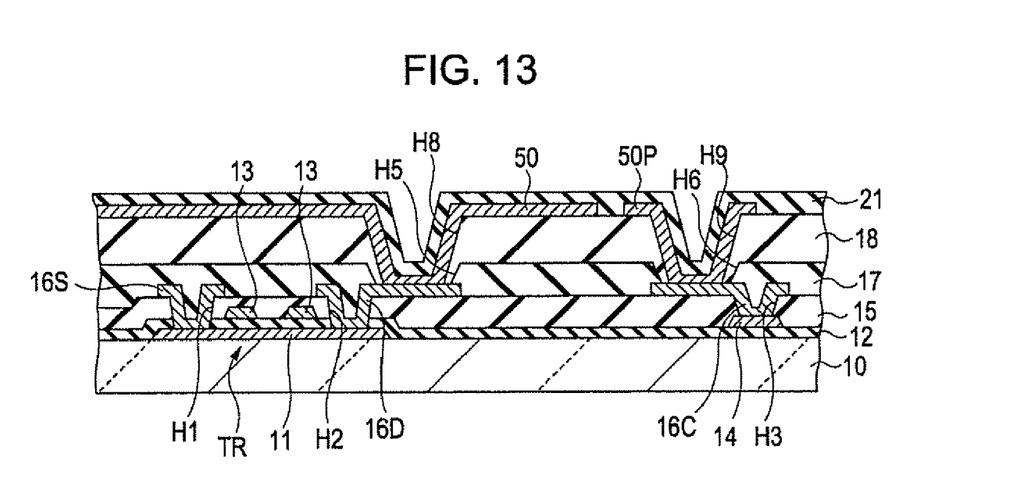
FIG. 13 is a cross-sectional view that shows the method of manufacturing the liquid crystal display device according to the second embodiment of the invention.
Figure 14:
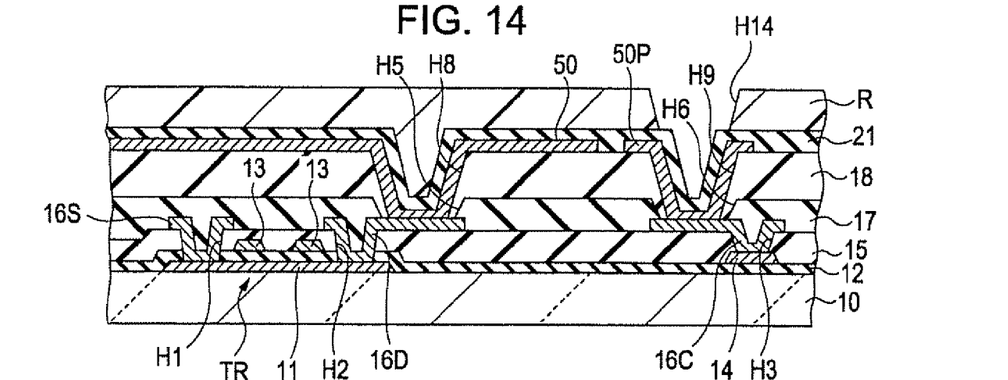
FIG. 14 is a cross-sectional view that shows the method of manufacturing the liquid crystal display device according to the second embodiment of the invention.

Next, as shown in FIG. 13, the insulating film 21 is formed so as to cover the pixel electrode 50 and the first etching stopper electrode 50P. After that, as shown in FIG. 14, the resist layer R is formed on the insulating film 21. In the resist layer R, instead of the opening H10 (see FIG. 7A and FIG. 8A) in the first embodiment, an opening H14 is formed above the first etching stopper electrode 50P.

Figure 15:
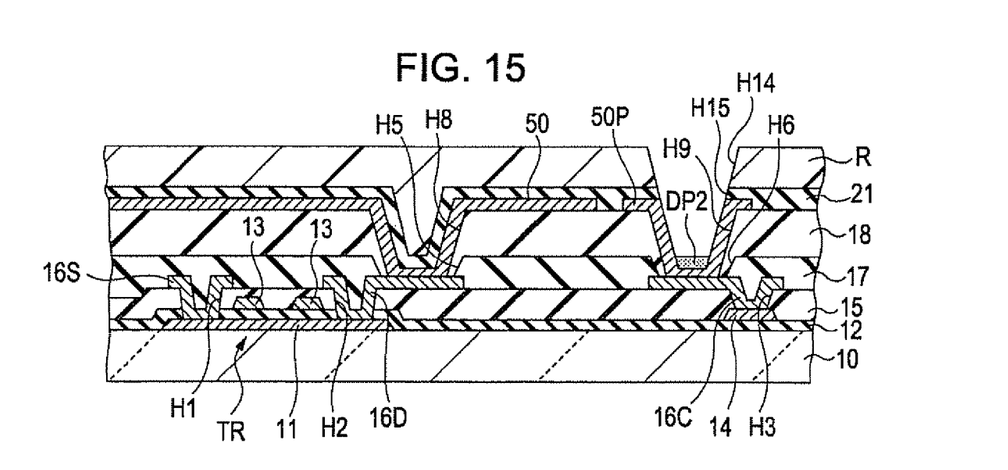
FIG. 15 is a cross-sectional view that shows the method of manufacturing the liquid crystal display device according to the second embodiment of the invention.

Then, as shown in FIG. 15, dry etching is performed on the insulating film 21 using the resist layer R as a mask, so that the contact hole H15 that exposes the first etching stopper electrode 50P inside the contact hole H9 is formed. The dry etching performed on the insulating film 21 is an example of a first etching process according to the aspects of the invention.

At this time, the residual deposit DP2, such as a polymer having a component of the resist layer R, is formed on the surface of the first etching stopper electrode 50P.

After that, using the resist layer R as a mask, by performing wet etching with an etchant, such as HF, the residual deposit DP2 is removed by etching. The wet etching that uses an etchant, such as HF, is an example of a second etching process according to the aspects of the invention.

After that, inside the contact hole H15, the progress of etching is stopped by the first etching stopper electrode 50P, so that etching on the planarization film 18 or the passivation film 17 is suppressed.

Figure 16:
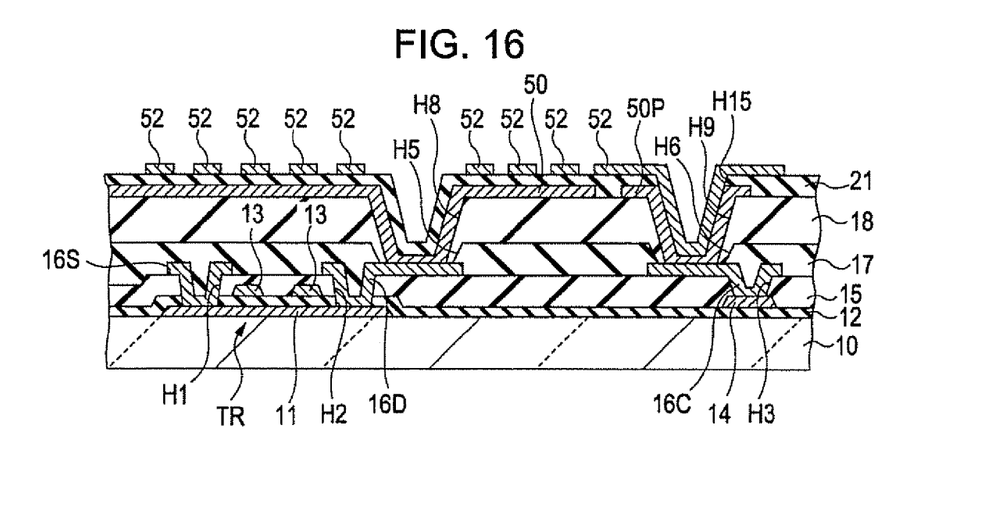
FIG. 16 is a cross-sectional view that shows the method of manufacturing the liquid crystal display device according to the second embodiment of the invention.

Next, after the resist layer R has been removed, as shown in FIG. 16, in the display portion 10A, a common electrode 52 is formed to be connected through the contact hole H15 to the first etching stopper electrode 50P and extends onto the insulating film 21. The common electrode 52 is, for example, formed of a transparent conductive material, such as ITO, and is formed of a plurality of slit portions and a plurality of linear portions are alternately arranged in parallel relation to one another.

After that, as in the case of the process shown in FIG. 10, in the display portion 10A, the second transparent substrate 30 is adhered so as to face the first transparent substrate 10, and then the liquid crystal LC is sealed between these substrates. Note that, in each of the above processes, the first polarizing plate PL1, the second polarizing plate PL2, the color filter 31, the alignment layer (not shown), and the like, are formed appropriately. In the thus manufactured liquid crystal display device according to the present embodiment as well, the same advantageous effects as those of the first embodiment are obtained.

Furthermore, according to a third embodiment of the invention, in the first embodiment shown in FIG. 4A to FIG. 10, instead of forming the common electrode line 14, the contact hole H3 and the lead line 16C, a common electrode line that is formed in the same layer as the drain electrode 16D and the lower layer electrode 16T may be arranged on the interlayer insulating film 15 at a position that overlaps the common electrode 20.

Similarly, according to a fourth embodiment of the invention, in the second embodiment shown in FIG. 12 to FIG. 16, instead of forming the common electrode line 14, the contact hole H3 and the lead line 16C, a common electrode line that is formed in the same layer as the drain electrode 16D and the lower layer electrode 16T may be arranged on the interlayer insulating film 15 at a position that overlaps the first etching stopper electrode 50P. The same or equivalent advantageous effects as those of the first and second embodiments are obtained in these third and fourth embodiments.

Note that in the first to fourth embodiments, the common electrode line 14 extends to the vicinity of the end portion of the display portion 10A, but the aspects of the invention are not limited. That is, the common electrode line 14 may extend into the pixel PXL or to the vicinity of the pixel PXL in the display portion 10A so as to be connected to the common electrode 20. In this case, particularly in the second and fourth embodiments, the advantageous effect that an increase in resistance due to the common electrode 20 that has the plurality of slit portions and the plurality of linear portions is suppressed is obtained.

In addition, in the first to fourth embodiments, the first etching stopper electrode 20P or 50P and the second etching stopper electrode 20T are formed of a transparent conductive material; however, they may be formed of a conductive material that is not transparent.

In addition, in the first to fourth embodiments, each of the pixels PXL operates in an FFS mode; however, the aspects of the invention are not limited to it. That is, the aspects of the invention may also be applied to a liquid crystal display device that operates in a mode other than the above as far as the liquid crystal display device controls the liquid crystal LC using an electric field that is substantially horizontal with respect to the first transparent substrate 10. For example, each of the pixels PXL may be the one that operates in an IPS mode. In this case, on the same transparent substrate, a linear pixel electrode and a linear common electrode are alternately arranged at predetermined intervals.

According to the aspects of the invention, in the liquid crystal display device that controls the liquid crystal using an electric field that is substantially horizontal with respect to the transparent substrate, an increase in contact resistance between the electrodes is suppressed, and a reduction in yields is suppressed. In addition, it is possible to avoid a decrease in the aperture ratio.

What is claimed is:
1. A liquid crystal display device comprising:
a switching element that has a drain electrode and that is arranged on a substrate;
a first insulating film that covers the switching element and that has a first opening on the drain electrode;
a first etching stopper electrode that is formed in the first opening and that is connected to the drain electrode;
a common electrode that is arranged on the first insulating film;
a second insulating film that covers the first etching stopper electrode and the common electrode, and that has a second opening on the first etching stopper electrode, wherein the second insulating film is formed in a space between the common electrode and the first etching stopper electrode; and
a pixel electrode that is connected through the second opening to the first etching stopper electrode and that extends onto the second insulating film so as to face the common electrode and overlap both of the first etching stopper electrode and the common electrode.

2. The liquid crystal display device according to claim 1, further comprising:
a lower layer electrode for external connection, which is arranged on the substrate and which is covered with the first insulating film;
a second etching stopper electrode that is formed on the first insulating film and that is connected through an opening of the first insulating film to the lower layer electrode; and
an upper layer electrode for external connection, which is formed on the second insulating film and which is connected to the second etching stopper electrode in an opening of the second insulating film.

3. The liquid crystal display device according to claim 1, further comprising:
an opposite substrate that is arranged so as to face the substrate; and
a liquid crystal that is held between the substrate and the opposite substrate, wherein
an alignment direction of the liquid crystal is controlled by an electric field generated between the common electrode and the pixel electrode.

4. A liquid crystal display device comprising:
a switching element that has a drain electrode and that is arranged on a substrate;
a common electrode line that is arranged on the substrate;
a lead line that extends from the common electrode line;
a first insulating film that covers the switching element, the drain electrode and the lead line, and that has a first opening on the drain electrode and a second opening on the lead line;
a first etching stopper electrode that is formed in the second opening and that is connected to the lead line;
a pixel electrode that is arranged on the first insulating film;
a second insulating film that covers the first etching stopper electrode and the pixel electrode, and that has a third opening on the first etching stopper electrode, wherein the second insulating film is formed in a space between the pixel electrode and the first etching stopper electrode; and
a common electrode that is connected through the third opening to the first etching stopper electrode and that extends onto the second insulating film so as to face the pixel electrode and overlap both of the first etching stopper electrode and the pixel electrode.

5. The liquid crystal display device according to claim 4, further comprising:
a lower layer electrode for external connection, which is arranged on the substrate and which is covered with the first insulating film;

a second etching stopper electrode that is formed on the first insulating film and that is connected through an opening of the first insulating film to the lower layer electrode; and an upper layer electrode for external connection, which is formed on the second insulating film and which is connected to the second etching stopper electrode in an opening of the second insulating film.

6. The liquid crystal display device according to claim 4, further comprising:

an opposite substrate that is arranged so as to face the substrate; and a liquid crystal that is held between the substrate and the opposite substrate, wherein an alignment direction of the liquid crystal is controlled by an electric field generated between the common electrode and the pixel electrode.

7. A liquid crystal display device comprising:

a switching element that has a drain electrode and that is arranged on a substrate;

a common electrode line that is arranged on the substrate;

a first insulating film that covers the switching element, the drain electrode and the common electrode line, and that has a first opening on the drain electrode and a second opening on the common electrode line;

a first etching stopper electrode that is formed in the second opening and that is connected to the common electrode line;

a pixel electrode that is arranged on the first insulating film;

a second insulating film that covers the first etching stopper electrode and the pixel electrode, and that has a third opening on the first etching stopper electrode, wherein the second insulating film is formed in a space between the pixel electrode and the first etching stopper electrode; and a common electrode that is connected through the third opening to the first etching stopper electrode and that extends onto the second insulating film so as to face the pixel electrode and overlap both of the first etching stopper electrode and the pixel electrode.

8. The liquid crystal display device according to claim 7, further comprising:

a lower layer electrode for external connection, which is arranged on the substrate and which is covered with the first insulating film;

a second etching stopper electrode that is formed on the first insulating film and that is connected through an opening of the first insulating film to the lower layer electrode; and an upper layer electrode for external connection, which is formed on the second insulating film and which is connected to the second etching stopper electrode in an opening of the second insulating film.

9. The liquid crystal display device according to claim 7, further comprising:

an opposite substrate that is arranged so as to face the substrate; and a liquid crystal that is held between the substrate and the opposite substrate, wherein an alignment direction of the liquid crystal is controlled by an electric field generated between the common electrode and the pixel electrode.

\* \* \* \* \*